Figure 1:
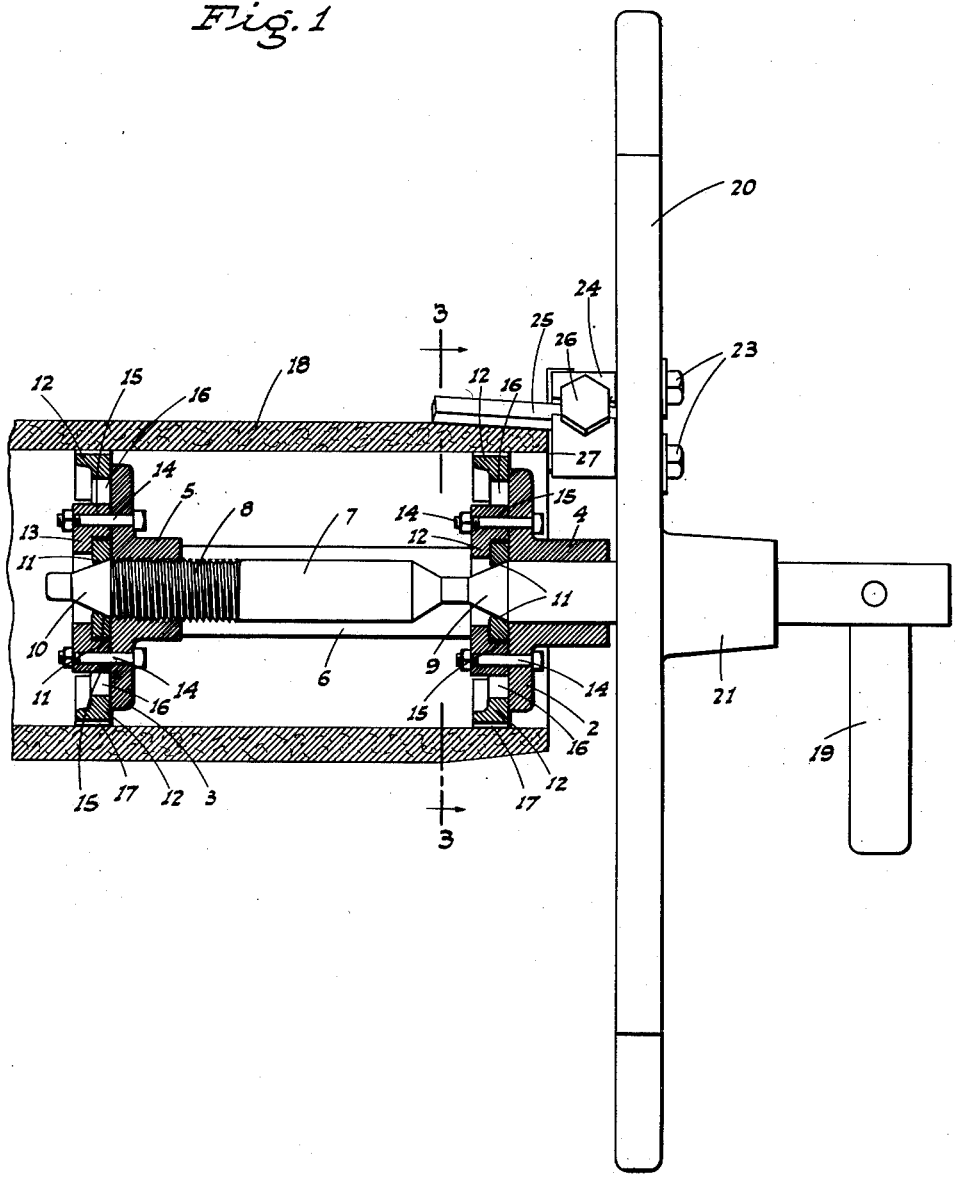

Nov. 4, 1952     G. F. HADDICAN     2,616,462
TOOL FOR TAPERING FIBER PIPE ENDS

Filed April 18, 1949     2 SHEETS—SHEET 1

INVENTOR.
Geo. F. Haddican
BY
ATTYS

Nov. 4, 1952          G. F. HADDICAN          2,616,462
TOOL FOR TAPERING FIBER PIPE ENDS
Filed April 18, 1949          2 SHEETS—SHEET 2
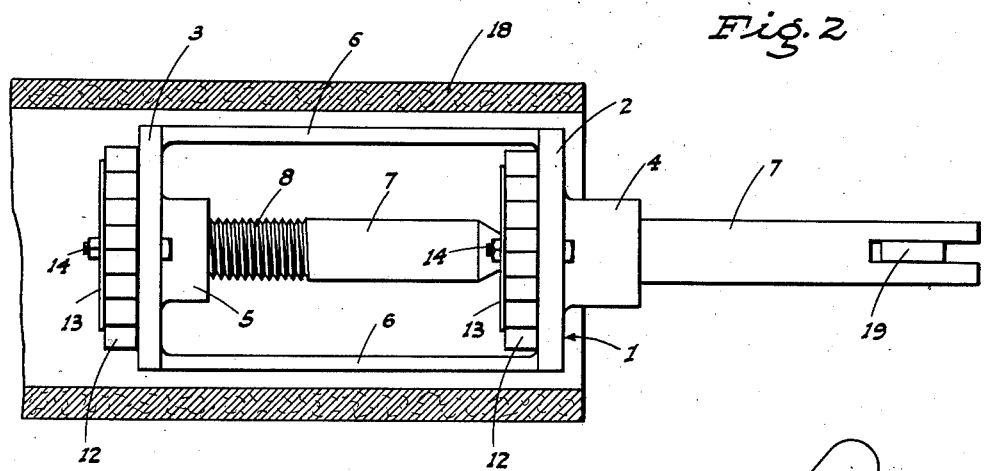
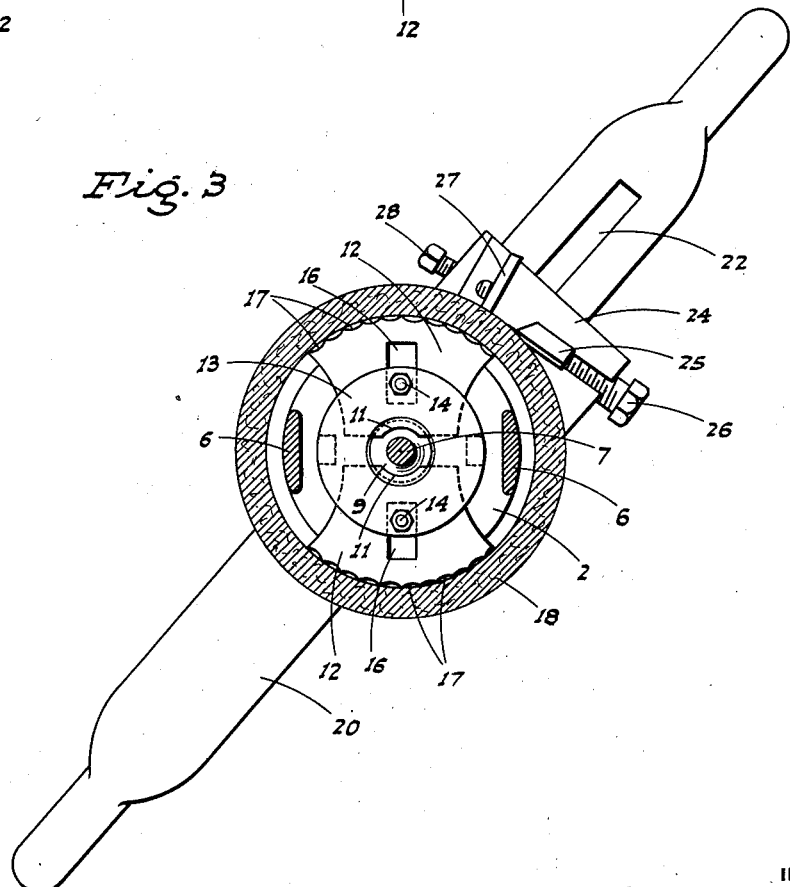
INVENTOR
Geo. F. Haddican
BY
ATTORNEYS Patented Nov. 4, 1952

2,616,462

UNITED STATES PATENT OFFICE 2,616,462

TOOL FOR TAPERING FIBER PIPE ENDS

George F. Haddican, Delano, Calif.

Application April 18, 1949, Serial No. 88,106

2 Claims. (Cl. 144—205)

This invention is directed to, and it is an object to provide, a portable, hand actuated tool—of novel structure—adapted for on-the-job use to cut a taper on the end of a fiber pipe preparatory to its engagement in wedging relation in the taper bell of a fitting.

Fiber pipe is initially of constant diameter from end to end and after being cut to length on the job must be end tapered exteriorly to engage in a fitting such as shown, for example, in copending application, Serial No. 719,998, filed January 3, 1947, issued May 17, 1949, as Patent No. 2,470,308.

Another object of the invention is to incorporate a novel expanding chuck assembly in the tool for holding engagement within the fiber pipe; said chuck assembly rigidly supporting the rotary cutter unit for effective and accurate taper cutting exteriorly on the adjacent end portion of said pipe.

A further object of the invention is to provide a tool, for the purpose described, which includes a novel cutter unit adapted to cut an exterior taper on an end portion of fiber pipe, and to simultaneously square-cut the corresponding end edge of said pipe, both for accurate engagement in the fitting.

An additional object of the invention is to provide a tool, for tapering fiber pipe ends, which is designed for ease and economy of manufacture.

It is also an object of the invention to provide a tool, as above, which is relatively simple in structure, but rugged and not easily subjected to damage.

A further object of the invention is to provide a practical and reliable tool for tapering fiber pipe ends, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation, with the chuck assembly and engaged fiber pipe in section, showing the tool as in use.

Fig. 2. is a fragmentary elevation of the chuck assembly as released.

Fig. 3 is a cross section on line 3—3 of Fig. 1.

Referring now more particularly to the characters of reference on the drawings, the tool comprises an elongated, somewhat cylindrical expanding assembly, indicated generally at 1; such chuck assembly comprising a pair of longitudinally spaced, radial end heads 2 and 3 which are circular and are formed with hubs 4 and 5.

The end heads 2 and 3 are maintained in fixed, spaced-apart relation by longitudinal connecting arms 6 extending between peripheral portions of said end heads a half-circle apart.

A rotary, axially movable spindle 7 extends through the hubs 4 and 5, being freely turnable and slidable in the hub 4 and projecting some distance outwardly thereof. At its opposite end portion the spindle 7 is threaded, as at 8, and the hub 5 is tapped to threadingly receive said end portion of the spindle.

Beyond corresponding faces of the end heads 2 and 3, the spindle 7 is formed with taper cams 9 and 10, and said taper cams cooperate with corresponding cam surfaces 11 on adjacent ends of pairs of opposed, radially extending segmental chucks 12 which cooperate with said cams 9 and 10. It will be recognized that with axial shifting of the spindle 7 in one direction or the other, such motion is converted by the cam arrangement to opposed outward or inward motion of the chucks 12 of each pair thereof.

Each pair of chucks 12 is disposed in facing engagement with the corresponding end head 2 or 3, being retained in slidable relation thereagainst by a chuck retention disc 13 held in place by cross bolts 14; each chuck retention disc 13 including guide lugs 15 which engage in radial slots 16 in the chucks 12. In this manner the chucks 12 of each pair are maintained in proper position for opposed inward or outward sliding motion; the outer edges of the chucks being serrated, as at 17, to assure of their positive frictional engagement in the fiber pipe 18 when the tool is in use.

Initially the chuck assembly 1 is contracted, and is then of lesser external diameter than the internal diameter of the fiber pipe 18 whose end portion is to be taper cut exteriorly.

The contracted chuck assembly is disposed in the end of the fiber pipe 18 in the manner shown in Fig. 2, and then said chuck assembly is expanded by rotation of the spindle 7 by means of a swing-out type lever handle 19 on the outer end of said spindle; rotation of the spindle shifting it axially by reason of its threading in the hub 5, and said axial shifting postively moving the chucks 12 radially outward into pipe engagement, in the manner previously explained. As so expanded, the chuck assembly 1 is positively secured in the fiber pipe 18, with the spindle 7 projecting axially out of the end thereof.

Between the hub 4 and handle 19 the tool is provided with a radial, double-ended rotary handle 20 having a hub 21 which runs free on, and is slidable along, said spindle.

Radially in one direction beyond the hub 21, the rotary handle 12 is formed with a longitudinal slot 22 through which bolts 23 adjustably secure a cutter mounting block 24 on said handle; said cutter mounting block being on the side of the handle adjacent the fiber pipe 18.

The cutter mounting block is fitted with a longitudinal, taper cutting blade 25 held in place by a set screw 26, and a transverse pipe end cutting or squaring blade 27 held in place by a set screw 28.

The blade 25 is set at such angle that upon rotation of the rotary handle 20, the blade acts on the adjacent exterior end portion of the fiber pipe 18, progressively cutting the desired taper thereon; the blade being rotated and fed wholly by manual operation of the rotary handle 20.

As the taper cutting blade 25 approaches the limit of its cut lengthwise of the fiber pipe 18, the transverse, pipe end cutting blade 27 engages the adjacent end edge of the fiber pipe 18, cutting it square; i. e. accurately at right angles to the axis of the pipe.

When the cutting operation is complete, the chuck assembly 1 is released by contracting it, and the tool is then removed from the pipe.

The described tool is practical and convenient to use on the job, and accomplishes an effective and accurate tapering and end squaring of fiber pipe for matching engagement in a taper bell of a fitting.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A tool for tapering a pipe end, comprising a longitudinal spindle, an expansible chuck assembly on the spindle adapted to be received in one end portion of the pipe with the spindle projecting therefrom, means operative upon rotation of the spindle to expand the chuck assembly into rigid engagement with the pipe, a rotary handle on the projecting portion of the spindle, and a pipe end taper cutting device mounted on the rotary handle radially out from the spindle; said chuck assembly including a pair of longitudinally spaced, radial end heads, means rigidly connecting said end heads as a unit, a pair of opposed chucks mounted on each end head for radial sliding motion, cam surfaces between the spindle and said chucks operative to oppositely slide the chucks of each pair upon axial shifting of the spindle through the heads, means to cause such axial shifting of said spindle and means to maintain the chucks in face to face engagement with the heads and comprising chuck retention discs engaging the faces of the chucks opposite the heads, said chucks having radial slots, guide lugs on the discs engaging in the slots, and cross bolts through the discs and lugs securing the discs to the heads.

2. A tool for finishing a pipe end comprising a longitudinal spindle adapted to be received in one end of a pipe and to project therefrom, a pipe end finishing tool unit rotatably mounted on the spindle outwardly of the pipe, a chuck assembly mounted on the spindle to engage the bore of the pipe and including a radial end head, a pair of opposed plate-like arcuate chuck members disposed against one face of the end head, means between the spindle, head and chuck members to shift the latter radially upon rotation of the spindle, and means to mount the chuck members in face to face engagement with the end head and comprising a retention disc engaging the face of the chuck members opposite the head, said members having radial slots, guide lugs on the disc projecting into the slot, and tie bolts through the head and lugs.

GEORGE F. HADDICAN.

REFERENCES CITED

The following references are of record in the file of this patent:

UNITED STATES PATENTS

| Number | Name | Date |
| --- | --- | --- |
| 305,035 | Lytle | Sept. 9, 1884 |
| 1,065,528 | Holland | June 24, 1913 |
| 1,691,045 | Burke | Nov. 13, 1928 |
| 1,823,959 | Steinmayer | Sept. 22, 1931 |
| 1,841,550 | Parker | Jan. 19, 1932 |
| 1,993,561 | Meglitz | Mar. 5, 1935 |
| 2,419,189 | Morrissette | Apr. 15, 1947 |